No. 733,734. PATENTED JULY 14, 1903.
W. H. McELREE.
CULTIVATOR ATTACHMENT.
APPLICATION FILED FEB. 5, 1903.
NO MODEL.
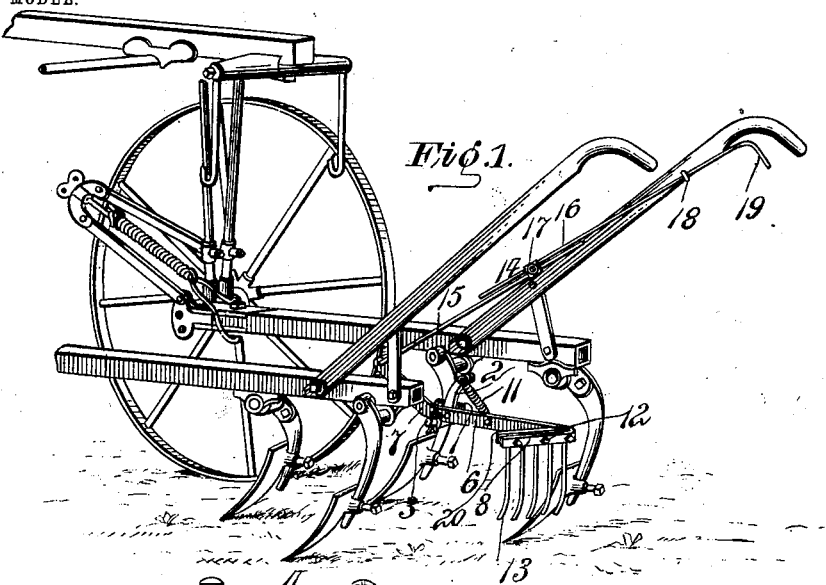
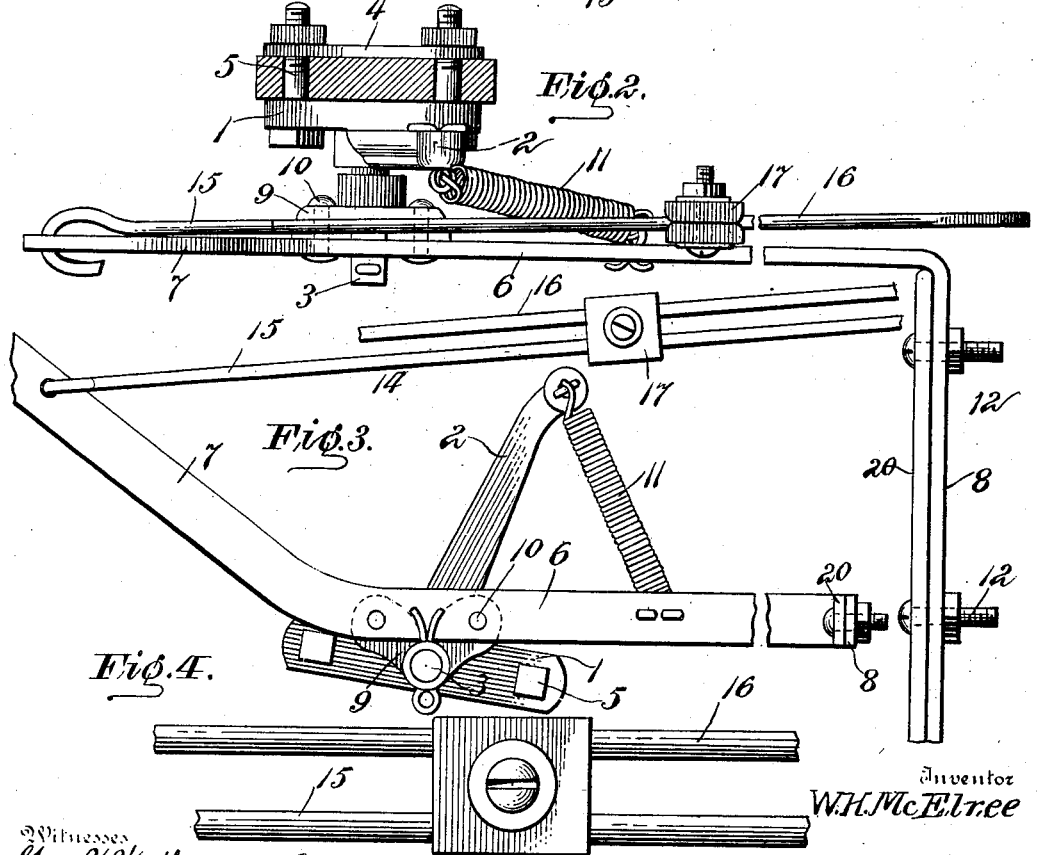

No. 733,734. Patented July 14, 1903.

UNITED STATES PATENT OFFICE.

WILLIAM H. McELREE, OF DUNKIRK, OHIO.

CULTIVATOR ATTACHMENT.

SPECIFICATION forming part of Letters Patent No. 733,734, dated July 14, 1903.

Application filed February 5, 1903. Serial No. 142,005. (No model.)

*To all whom it may concern:*

Be it known that I, WILLIAM H. McELREE, a citizen of the United States, residing at Dunkirk, in the county of Hardin and State of Ohio, have invented certain new and useful Improvements in Cultivator Attachments; and I do declare the following to be a full, clear, and exact description of the invention, such as will enable others skilled in the art to which it appertains to make and use the same.

My invention is an improved cultivator attachment adapted for use in connection with sulky-cultivators, both riding and walking, for uncovering the plants which may become covered by clods thrown from the cultivator-shovels, and also adapted for use in destroying weeds between the rows; and it consists in the peculiar construction and combination of devices hereinafter described and claimed.

In the accompanying drawings, Figure 1 is a perspective view of a portion of a walking sulky-cultivator provided with my improved uncovering and weeding attachment. Fig. 2 is a detail top plan view of my improved uncovering and weeding attachment. Fig. 3 is a detail elevation thereof. Fig. 4 is a detail elevation of the operating-rod.

In the embodiment of my invention I provide a clip 1, which is provided with an arm 2 and an outstanding pivot-spindle 3. A yoke-plate 4 is connected to the clip by means of bolts 5. This yoke-plate and the bolts enable the clip to be detachably secured to one of the standards of cultivator, as will be readily understood.

A longitudinally-disposed arm 6, which has its front end portion preferably upturned somewhat, as at 7, and its rear portion turned inwardly at right angles, as at 8, is provided at a suitable distance from its front end with a bearing 9. The latter is here shown as detachably secured to the arm 6 by means of bolts 10, and the said bearing receives a pivot-spindle and coacts therewith in pivotally connecting the arm 6 to the clip. Said arm 6 is connected by a spring 11, which is here shown as a coiled extensile spring, to the upper end of the arm 2.

The plate 20 is connected to the arm 8 by means of bolts 12, and between the said plate and the said arm 8 are clamped the upper end of a number of rake-tines 13, the latter being of any suitable length and appropriately spaced apart. The function of the spring is to normally raise the bar 6, so as to raise the tines from the ground.

A rod 14, which comprises the sections 15 16 and a clamp 17, that connects the said sections together, is employed for operating my improved cultivator attachment. The lower end of the section 15 is pivotally connected to the upturned portion 7 of the arm or bar 6, and the bar 16 is slidably connected to one of the handles of the cultivator, as by screw-eye 18, and has at its rear end a handle 19, whereby it may be grasped by the operator, who, when a plant has become covered by a clod or by earth thrown thereon by the cultivator-shovels, grasps and draws the rod 14, and thereby causes the rake attachment to be lowered to the ground and to uncover the plant as it passes the same, the spring immediately raising the rake attachment as soon as the plowman releases the handle of the operating-rod. By forming the latter of two sections slidably connected together by the clamp hereinbefore described the said operating-rod may be lengthened or shortened, as may be required, by the make of the cultivator in connection with which it is used.

When in use in a riding sulky-cultivator, the operating-rod may be dispensed with and a suitable chain or cord attached to the upturned end 7 of the arm 6 for use by the operator, as will be understood.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus fully described my invention, what I claim as new, and desire to secure by Letters Patent, is—

1. A cultivator attachment of the class described, comprising a clip having a spindle projecting outwardly from one side thereof and provided also with an upwardly-extending arm, an implement having a bar provided with a bearing engaged by the spindle, whereby the rake-bar is pivotally connected to the clip, a spring connecting the arm of the latter to the rake-bar, and means connected directly to the rake-bar to depress the same against the tension of the spring, substantially as described.

2. A cultivator attachment of the class described, comprising a clip having a spindle projecting outwardly from one side thereof and provided also with an upwardly-extending arm, an implement having a bar provided with a bearing engaged by the spindle and having an upturned arm 7 at its front end, said implement-bar being further provided with a bearing engaged by the spindle to pivotally mount said bar, a spring connecting the latter to the arm of the clip, and an operating-rod attached to the said arm 7, substantially as described.

In testimony whereof I have hereunto set my hand in presence of two subscribing witnesses.

WILLIAM H. McELREE.

Witnesses:
C. FRIEDLY,
CAREY FRIEDLY.